United States Patent
Ibrahim

(10) Patent No.: US 7,379,546 B2
(45) Date of Patent: May 27, 2008

(54) METHOD FOR XZ-ELLIPTIC CURVE CRYPTOGRAPHY

(75) Inventor: Mohammad K. Ibrahim, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 871 days.

(21) Appl. No.: 10/790,677

(22) Filed: Mar. 3, 2004

(65) Prior Publication Data

US 2005/0195973 A1    Sep. 8, 2005

(51) Int. Cl.
*H04K 1/00* (2006.01)
*H04L 9/00* (2006.01)

(52) U.S. Cl. .......................... 380/28; 380/30; 380/44; 380/259; 380/263; 380/277; 380/278; 380/282; 380/286

(58) Field of Classification Search .................. 380/1, 380/28, 30, 277, 278, 44, 259, 263, 282, 380/286; 713/176
See application file for complete search history.

(56) References Cited

U.S. PATENT DOCUMENTS

| | | | |
|---|---|---|---|
| 4,200,770 | A | 4/1980 | Hellman et al. |
| 6,088,453 | A * | 7/2000 | Shimbo .................. 380/28 |
| 6,424,712 | B2 | 7/2002 | Vanstone et al. |
| 6,876,745 | B1 * | 4/2005 | Kurumatani .................. 380/28 |
| 7,162,033 | B1 * | 1/2007 | Coron .......................... 380/30 |
| 2001/0046291 | A1 * | 11/2001 | Vanstone et al. ............. 380/28 |
| 2002/0065574 | A1 | 5/2002 | Nakada |
| 2003/0059042 | A1 * | 3/2003 | Okeya et al. .................. 380/30 |
| 2003/0123656 | A1 * | 7/2003 | Izu et al. ....................... 380/30 |
| 2003/0142820 | A1 | 7/2003 | Futa et al. |
| 2004/0114756 | A1 * | 6/2004 | Moller et al. .................. 380/30 |
| 2004/0228478 | A1 * | 11/2004 | Joye ............................. 380/28 |
| 2004/0247114 | A1 * | 12/2004 | Joye ............................. 380/28 |

OTHER PUBLICATIONS

Coron, "Resistance Against Differential Power Analysis for Elliptic Curve Cryptosystems", Springer-Verlag, 1999.*
Okeya et al. "Power Analysis Breaks Elliptic Curve Cryptosystems even Secure against the Timing Attack", Hitachi, Ltd, 2000.*
Izu et al. "A Fast Elliptic Curve Multiplication Resistant against Side Channel Attacks", Fujitsu Laboratories Ltd, 2002.*
Joye et al. "Protection against Differential Analysis for Elliptic Curve Cryptography" Gemplus Card International, 2001.*

* cited by examiner

*Primary Examiner*—Kim Vu
*Assistant Examiner*—Beemnet W Dada
(74) *Attorney, Agent, or Firm*—Lowe Hauptman Ham & Berner LLP

(57) ABSTRACT

Given a set of elliptic curve points defined over a field F(p) and represented in projective coordinate, a method is presented which allows the embedding of data bits in both the X-coordinate and the Z-coordinate of the elliptic curve point when represented in projective coordinate. This makes the number of points that satisfy an elliptic curve equation and which can be used in the corresponding cryptosystem proportional to $p^2$ rather than p. This can be used to either increase security by making the bit positions where data bits are embedded known only to the sender and receiver. Alternatively, it can be used to increase the number of data bits that can be encrypted per single elliptic curve point encryption. In another alternative, it can also be used to reduce p. Also, it can be used as a countermeasure by randomizing the bit positions where data bits are embedded. A similar formulation can be developed for elliptic curves over fields $F(2^m)$, as well as special elliptic curves such as Montgomery curves.

6 Claims, No Drawings

METHOD FOR XZ-ELLIPTIC CURVE CRYPTOGRAPHY

FIELD OF THE INVENTION

This invention relates to a method for XZ-Elliptic Curve Cryptography and more particularly to a method for encrypting and decrypting a message bit string using a group of points on an elliptic curve over a finite field and wherein the group of points of the elliptic curve are defined over additions in projective coordinates.

BACKGROUND FOR THE INVENTION

Cryptography provides methods of providing privacy and authenticity for remote communications and data storage. Privacy is achieved by encryption of data, usually using the techniques of symmetric cryptography (so called because the same mathematical key is used to encrypt and decrypt the data). Authenticity is achieved by the functions of user identification, data integrity, and message non-repudiation. These are best achieved via asymmetric (or public-key) cryptography.

In particular, public-key cryptography enables encrypted communication between users that have not previously established a shared secret key between them. This is most often done using a combination of symmetric and asymmetric cryptography: public-key techniques are used to establish user identity and a common symmetric.key, and a symmetric encryption algorithm is used for the encryption and decryption of the actual messages. The former operation is called key agreement. Prior establishment is necessary in symmetric cryptography, which uses algorithms for which the same key is used to encrypt and decrypt a message. Public-key cryptography, in contrast, is based on key pairs. A key pair consists of a private key and a public key. As the names imply, the private key is kept private by its owner, while the public key is made public (and typically associated to its owner in an authenticated manner). In asymmetric encryption, the encryption step is performed using the public key, and decryption using the private key. Thus the encrypted message can be sent along an insecure channel with the assurance that only the intended recipient can decrypt it.

The key agreement can be interactive (e.g., for encrypting a telephone conversation) or non-interactive (e.g., for electronic mail).

User identification is most easily achieved using what are called identification protocols. A related technique, that of digital signatures, provides data integrity and message non-repudiation in addition to user identification.

The public key is used for encryption or signature verification of a given message, and the private key is used for decryption or signature generation of the given message.

The use of cryptographic key pairs was disclosed in U.S. Pat. No. 4,200,770, entitled "CRYPTOGRAPHIC APPARATUS AND METHOD." U.S. Pat. No. 4,200,770 also disclosed the application of key pairs to the problem of key agreement over an insecure communication channel. The algorithms specified in this U.S. Pat. No. 4,200,770 relies for their security on the difficulty of the mathematical problem of finding a discrete logarithm. U.S. Pat. No. 4,200,770 is hereby incorporated herein its entirety by reference.

In order to undermine the security of a discrete-logarithm based crypto algorithm, an adversary must be able to perform the inverse of modular exponentiation (i.e., a discrete logarithm). There are mathematical methods for finding a discrete logarithm (e.g., the Number Field Sieve), but these algorithms cannot be done in any reasonable time using sophisticated computers if certain conditions are met in the specification of the crypto algorithm.

In particular, it is necessary that the numbers involved be large enough. The larger the numbers used, the more time and computing power is required to find the discrete logarithm and break the cryptograph. On the other hand, very large numbers lead to very long public keys and transmissions of cryptographic data. The use of very large numbers also requires large amounts of time and computational power in order to perform the crypto algorithm. Thus, cryptographers are always looking for ways to minimize the size of the numbers involved, and the time and power required, in performing the encryption and/or authentication algorithms. The payoff for finding such a method is that cryptography can be done faster, cheaper, and in devices that do not have large amounts of computational power (e.g., hand-held smart-cards).

A discrete-logarithm based crypto algorithm can be performed in any mathematical setting in which certain algebraic rules hold true. In mathematical language, the setting must be a finite cyclic group. The choice of the group is critical in a cryptographic system. The discrete logarithm problem may be more difficult in one group than in another for which the numbers are of comparable size. The more difficult the discrete logarithm problem, the smaller the numbers that are required to implement the crypto algorithm. Working with smaller numbers is easier and faster than working with larger numbers. Using small numbers allows the cryptographic system to be higher performing (i.e., faster) and requires less storage. So, by choosing the right kind of group, a user may be able to work with smaller numbers, make a faster cryptographic system, and get the same, or better, cryptographic strength than from another cryptographic system that uses larger numbers.

1.1 Elliptic Curves & Cryptography

The groups referred to above come from a setting called finite fields. Methods of adapting discrete-logarithm based algorithms to the setting of elliptic curves are known. However, finding discrete logarithms in this kind of group is particularly difficult. Thus elliptic curve-based crypto algorithms can be implemented using much smaller numbers than in a finite-field setting of comparable cryptographic strength. Thus the use of elliptic curve cryptography is an improvement over finite-field based public-key cryptography.

In practice, an Elliptic Curve group over Fields F(p) is formed by choosing a pair of a and b coefficients, which are elements within F(p). The group consists of a finite set of points P(x,y) which satisfy the elliptic curve equation $$F(x,y)=y^2-X^3-ax-b=0 \qquad 1.1$$

together with a point at infinity, O. The coordinates of the point, x and y, are elements of F(p) represented in N-bit strings. In what follows, a point is either written as a capital letter, e.g. P, or as a pair in terms of the affine coordinates, i.e. (x,y).

The Elliptic Curve Cryptosystem relies upon the difficulty of the Elliptic Curve Discrete Logarithm Problem (ECDLP) to provide its effectiveness as a cryptosystem. Using multiplicative notation, the problem can be described as: given points B and Q in the group, find a number k such that $B^k=Q$; where k is called the discrete logarithm of Q to the base B. Using additive notation, the problem becomes: given two points B and Q in the group, find a number k such that kB=Q.

In an Elliptic Curve Cryptosystem, the large integer k is kept private and is often referred to as the secret key. The point Q together with the base point B are made public and are referred to as the public key. The security of the system, thus, relies upon the difficulty of deriving the secret k, knowing the public points B and Q. The main factor that determines the security strength of such a system is the size of its underlying finite field. In a real cryptographic application, the underlying field is made so large that it is computationally infeasible to determine k in a straightforward way by computing all the multiples of B until Q is found.

The core of the elliptic curve geometric arithmetic is an operation called scalar multiplication which computes kB by adding together k copies of the point B. The scalar multiplication is performed through a combination of point-doubling and point-addition operations. The point-addition operation adds two distinct points together and the point-doubling operation adds two copies of a point together. To compute, for example, 11 B=(2*(2*(2B)))+2B=Q, it would take 3 point-doublings and 2 point-additions.

Addition of two points on an elliptic curve is calculated as follows. When a straight line is drawn through the two points, the straight line intersects the elliptic curve at a third point. The point symmetric to this third intersecting point with respect to the x-axis is defined as a point resulting from the addition.

Doubling a point on an elliptic curve is calculated as follows. When a tangent line is drawn at a point on an elliptic curve, the tangent line intersects the elliptic curve at another point. The point symmetric to this intersecting point with respect to the x-axis is defined as a point resulting from the doubling.

Table 1 illustrates the addition rules for adding two points $(x_1, y_1)$ and $(x_2, y_2)$ that is, $$(x_3, y_3) = (x_1, y_1) + (x_2, y_2) \qquad 1.2$$

TABLE 1

Summary of Addition Rules:
$(x_3, y_3) = (x_1, y_1) + (x_2, y_2)$

| | |
|---|---|
| General Equations | $x_3 = m^2 - x_2 - x_1$ |
| | $y_3 = m(x_3 - x_1) + y_1$ |
| Point Addition | $m = \dfrac{y_2 - y_1}{x_2 - y_1}$ |
| Point Doubling $(x_3, y_3) = 2(x_1, y_1)$ | $m = \dfrac{3x_1^2 - a}{2y_1}$ |
| $(x_2, y_2) = -(x_1, y_1)$ | $(x_3, y_3) = (x_1, y_1) + (-(x_2, y_2)) = O$ |
| $(x_2, y_2) = O$ | $(x_3, y_3) = (x_1, y_1) + O = (x_1, y_1)$ |
| $-(x_1, y_2)$ | $= (x_1, -y_1)$ |

1.2 Overview of Elliptic Curve Encryption and Decryption

Given a message point $(x_m, y_m)$, a base point $(x_B, y_B)$, and a given key, k, the cipher point $(x_c, y_c)$ is obtained using the following equation, $$(x_c, y_c) = (x_m, y_m) + k(x_B, y_B) \qquad 1.3$$

There are two basics steps in the computation of the above equations. The first is to find the scalar multiplication of the base point with the key, "$k(x_B, y_B)$". The resulting point is then added to the message point, $(x_m, y_m)$ to obtain the cipher point.

At the receiver, the message point is recovered from the cipher point which is usually transmitted, the shared key and the base point, that is $$(x_m, y_m) = (x_c, y_c) - k(x_B, y_B) \qquad 1.4$$

1.3 Embedding Message Data on Elliptic Curve Points

As indicated earlier, the x-coordinate, $x_m$, is represented as an N-bit string. Not all of the N-bits are used to carry information about the data of the secret message.

Assuming that the number of bits of the x-coordinate, $x_m$, that do not carry data is L. The extra bits, L, are used to ensure that message data when embedded into the x-coordinate will lead to an $x_m$ value that satisfies the elliptic curve equation, equation 1.1. Usually, if the first guess of $x_m$ is not on a curve, then the second or third try is. This was first proposed in "N. Kobltiz, Introduction to Elliptic Curve and Modular Forms, New York: Springer-Verlag 1993".

Therefore the number of bits used to carry the bits of the message data is (N−L). Assuming that the secret data is an M-bit string. The number of elliptic curve points needed to encrypt the K-bit data is $$\left\lceil \frac{K}{N-L} \right\rceil.$$

It is important to note that the y-coordinate, $y_m$, of the message point carries no data bits.

1.4 Attacks

The difficulty in solving the elliptic curve discrete logarithm problem has been established theoretically while information associated with secret information such as the private key or the like may leak out in cryptographic processing in real mounting. Thus, there has been proposed an attack method of so-called power analysis in which the secret information is decrypted on the basis of the leak information.

An attack method in which change in voltage is measured in cryptographic processing using secret information such as DES (Data Encryption Standard) or the like, so that the process of the cryptographic processing is obtained and the secret information is inferred on the basis of the obtained process is disclosed in P. Kocher, J. Jaffe and B. Jun Differential Power Analysis, Advances in Cryptology: Proceedings of CRYPTO '99, LNCS 1666, Springer-Verlag, (1999) pp. 388-397. This attack method is called DPA (Differential Power Analysis).

An elliptic curve cryptosystem to which the above-mentioned attack method is applied is disclosed in J. Coron, Resistance against Differential Power Analysis for Elliptic Curve Cryptosystems, Cryptographic Hardware and Embedded Systems: Proceedings of CHES '99, LNCS 1717, Springer-Verlag, (1999) pp. 292-302. In the elliptic curve cryptosystem, encryption, decryption, signature generation and signature verification of a given message have to be carried out with elliptic curve operations. Particularly, calculation of scalar multiplication on an elliptic curve is used in cryptographic processing using a scalar value as secret information.

As one of the measures against DPA attack on elliptic curve cryptosystems, a method using randomized projective coordinates is known. This is a measure against an attack method of observing whether a specific value appears or not in scalar multiplication calculation, and inferring a scalar value from the observing result. That is, by multiplication with a random value, the appearance of such a specific value is prevented from being inferred.

In the above-mentioned background-art elliptic curve cryptosystem, attack by power analysis such as DPA or the like was not taken into consideration. Therefore, to relieve the attack by power analysis, extra calculation, or the like, other than necessary calculation had to be carried out in cryptographic processing using secret information so as to weaken the dependence of the process of the cryptographic processing and the secret information on each other. Thus, time required for the cryptographic processing increased so that cryptographic processing efficiency was lowered conspicuously in a computer such as an IC card, or the like, which was slow in calculation speed, a server managing an enormous number of cryptographic processes, or the like. In addition, the dependence of cryptographic processing process and secret information on each other cannot be cut off perfectly. In addition, if priority was given to the cryptographic processing efficiency, the cryptosystem was apt to come under attack by power analysis so that there was a possibility that secret information leaks out 1.5 Speed of Computations With the development of information communication networks, cryptographic techniques have been indispensable elements for concealment or authentication about electronic information. Speeding up is demanded along with the security of the cryptographic techniques. The elliptic curve discrete logarithm problem is so difficult that elliptic curve cryptosystems can make key length shorter than that in RSA (Rivest-Shamir-Adleman) cryptosystems basing their security on the difficulty of factorization into prime factors. Thus, the elliptic curve cryptosystems open the way to comparatively high-speed cryptographic processing. However, the processing speed is not always high enough to satisfy smart cards which have restricted throughput or servers which have to carry out large volumes of cryptographic processing. It is therefore demanded to further speed up the processing in cryptosystems.

The two equations for m in Table 1 are called slope equations. Computation of a slope equation in integer fields requires one modular integer division. Alternatively, the slope computation can be computed using one modular integer inversion and one modular integer multiplication. Modular integer division and modular integer inversion are expensive computationally because they require extensive CPU cycles for the manipulation of two large integers modular a large prime number. Today, it is commonly accepted that a point-doubling and point-addition operation each requires one inversion, two multiplies, a square, and several additions. To date there are techniques to compute modular integer division and modular integer inversion, and techniques to trade expensive inversions for multiplies by performing the operations in projective coordinates.

In cases where field inversions are significantly more expensive than multiplication, it is efficient to implement projective coordinates. An elliptic curve projective point (X,Y,Z) in conventional projective (or homogeneous) coordinates satisfies the homogeneous Weierstrass equation, $$\tilde{F}(X,Y,Z)=Y^2Z-X^3-aXZ^2-bZ^3=0 \qquad 1.5$$

and, when $Z \neq 0$, it corresponds to the affine point $$(x, y) = \left(\frac{X}{Z}, \frac{Y}{Z}\right).$$

It turns out that other projective representations lead to more efficient implementations of the group operation [D. V. Chudnovsky and G. V. Chudnovsky, Sequences of numbers generated by addition in formal groups and new primality and factorization tests, Adv. In Appli. Math. Vol. 7, 1987, pp 385-434.]. In particular, the Jacobian representations where the triplets (X,Y,Z) corresponds to the affine coordinates $$(x, y) = \left(\frac{X}{Z^2}, \frac{Y}{Z^3}\right)$$

whenever $Z \neq 0$. This is equivalent to using Jacobian elliptic curve equation that is of the form, $$\tilde{F}_j(X,Y,Z)=y^2-X^3-aXZ^4-bZ^6=0 \qquad 1.6$$

Another commonly used projection is the Chudnovsky-Jacobian coordinates.

In general terms, the relationship between the affine coordinates and the projection coordinates can be written as $$(x, y) = \left(\frac{X}{Z^i}, \frac{Y}{Z^j}\right)$$

where the values of i and j depend on the choice of the projective coordinates. For example for homogeneous coordinates, i=1 and j=1.

It is important to note that the group addition rules are defined in the affine coordinates and not in any of the projective coordinates, that is, $$\left(\frac{X_3}{Z_3^i}, \frac{Y_3}{Z_3^j}\right) = \left(\frac{X_1}{Z_1^i}, \frac{Y_1}{Z_1^j}\right) + \left(\frac{X_2}{Z_2^i}, \frac{Y_2}{Z_2^j}\right) \qquad 1.7$$

In other words, the computation of the coordinate values of $X_3$, $Y_3$ and $Z_3$ are based on the equations in Table 1, whereby the value of $Z_3$ is chosen from the denominator of the equations in Table 1 in order to remove the division operations from the calculations of $X_3$ and $Y_3$ This implies that $$\left(\frac{X_1}{Z_1^i}, \frac{Y_1}{Z_1^j}\right), \left(\frac{X_2}{Z_2^i}, \frac{Y_2}{Z_2^j}\right) \text{ and } \left(\frac{X_3}{Z_3^i}, -\frac{Y_3}{Z_3^j}\right)$$

lie on the same straight line, while $(X_1, Y_1, Z_1)$, $(X_2, Y_2, Z_2)$ and $(X_3, -Y_3, Z_3)$ do not lie on the same line.

This implies that one cannot write, $$(X_3, Y_3, Z_3)=(X_1, Y_1, Z_1)+(X_2, Y_2, Z_2)$$

when the addition, +, is defined over the affine coordinate.

It should be noted that defining the elliptic curve points as a group over addition is necessary so that equation 1.7 can be re-written as, $$\left(\frac{X_2}{Z_2^i}, \frac{Y_2}{Z_2^j}\right) = \left(\frac{X_3}{Z_3^i}, \frac{Y_3}{Z_3^j}\right) - \left(\frac{X_1}{Z_1^i}, \frac{Y_1}{Z_1^j}\right)$$

It is this group definition, which leads to the fact that decryption, which is described in equation 1.4, is in fact the reciprocal of encryption as defined in equation 1.3.

The use of projective coordinates circumvents the need for division in the computation of each point addition and point doubling during the calculation of scalar multiplication. Therefore, integer modular division can be avoided in the calculation of scalar multiplication, $$k\left(\frac{X_B}{Z_B^i}, \frac{Y_B}{Z_B^j}\right)$$

when using projective coordinate.

The last addition for the computation of the cipher point, $$\left(\frac{X_C}{Z_C^i}, \frac{Y_C}{Z_C^j}\right),$$

i.e. the addition of the two points $$\left(\frac{X_m}{Z_m^i}, \frac{Y_m}{Z_m^j}\right) \text{ and } k\left(\frac{X_B}{Z_B^i}, \frac{Y_B}{Z_B^j}\right)$$

can also be carried out in the chosen projection coordinate, that is $$\left(\frac{X_C}{Z_C^i}, \frac{Y_C}{Z_C^j}\right) = \left(\frac{X_m}{Z_m^i}, \frac{Y_{ml}}{Z_m^j}\right) + \left(\frac{X_B}{Z_B^i}, \frac{Y_B}{Z_B^j}\right)$$

It should be pointed out that $Z_m=1$.

However, one division (or one inversion and one multiplication) must still be carried out to calculate $$x_C = \frac{X_C}{Z_C^i},$$

since only the affine x-coordinate of the cipher point, $x_C$, is sent by the sender.

Therefore the encryption of (N−L) bits of the secret message using elliptic curve encryption requires at least one division when using projective coordinates. Similarly, the decryption of a single message encrypted using elliptic curve cryptography also requires at least one division when using projective coordinates.

The state of elliptic curve cryptography is described in a paper by Neal Koblitz, Alfred Meneges and Scott Vanstone, Design, Codes and Cryptography 19 173-193 (2000) which is incorporated herein in its entirety by reference. More recent developments are described in the Vanstone et al. U.S. Pat. No. 6,424,712 and the published patent applications U.S. 2003/0059042 of Okeya et al., number 2003/0123656 of Izu et al. and 2003/0142820 of Futa et al. all of which are incorporated herein by reference. An earlier Pat. No. 4,200,770 of Hellman et al. discloses an earlier cryptographic apparatus and method and is also incorporated herein by reference.

The 0059042, 0123656 and 0142820 patent applications and U.S. application Ser. No. 6,424,712 address the issue of speeding up elliptic curve scale multiplications.

BRIEF SUMMARY OF THE INVENTION

In essence, the present invention contemplates an improved method for communicating securely over an insecure channel using elliptic curve cryptography. The improvement comprises applying projective coordinates in two stages. In a first of the two stages, a projective coordinate is used to embed extra message data bits in the Z coordinate. Then, in a second stage a projective coordinate is used to remove a division operation at each iteration and for randomizing the computation in order to provide a counter measure against differential power analysis.

In a preferred embodiment of the invention, a method for encrypting or encoding and decrypting or decoding a message bit string in an information processing system is provided. The method includes the step of establishing an elliptic curve message point $(X_m Y_m Z_m)$ and embedding a message bit string into the elliptic curve message point. A shared key (k) and a base point $(X_b Y_b Z_b)$ are provided and the scaller multiplication $(X_{bk} Y_{bk} Z_{bk})=k (X_b Y_b Z_b)$ is computed. A cipher point $(X_c Y_c Z_c)$ is then computed using $(X_c Y_c Z_c)=(X_m Y_m Z_m)+k (X_b Y_b Z_b)$. Appropriate bits of the X-coordinate, $X_c$ and the Z-coordinate $Z_c$ of the cipher point $(X_c Y_c Z_c)$ are then sent to a receiving party and the shared key k and base point $(X_b Y_b Z_b)$ are used in computing a scaller multiplication $(X_{bk} Y_{bk} Z_{bk})=k(X_b Y_b Z_b)$. Computing the message point $(X_m Y_m Z_m)$ using $(X_m Y_m Z_m)=(X_c Y_c Z_c)+(-k(X_b Y_b Z_b))$ and recovering the message bit string from $X_m$ and $Z_m$ completes the method.

In the classical approach of elliptic curve cryptography, encryption and decryption, the message data bits are embedded in only the affine x-coordinate, $x_m$, of the elliptic curve points. Furthermore, given an elliptic curve defined over F(p) that need N-bit for the representation of its elements, each x-coordinate, $x_m$, carries only (N−L) bits of the message data bits. Therefore, at least one inversion or division over F(p), i.e. one modulo p inversion or division, is needed per (N−L)-bit encryption.

In this invention, a new approach to elliptic curve cryptography is presented where the encryption of more than (N−L)-bits of the message data is achieved per one inversion or division over F(p), i.e. per one modulo p inversion or division.

This is achieved by defining an elliptic curve group over addition in projective coordinates. This allows the embedding of the data bits in both the X-coordinate and the Z-coordinate of the elliptic curve points, where X and Z are elements of F(p) represented in N-bit strings. In the new invention, the relevant bits of both the X and Z coordinates of the cipher point are sent to the receiver.

At the receiving entity, the message bits are recovered from X and Z coordinates of the cipher point using one inversion or division over F(p), i.e. per one modulo p inversion or division.

In the proposed invention, a second projective coordinate is used at the sending and receiving entities to eliminate the inversion or division during each addition and doubling operations of the scalar multiplication. In theory, up to (2N−L) bits of the message data can be encrypted and subsequently decrypted using one inversion or division. The number of multiplications, additions, and squaring needed in the new scheme are comparable with that needed in classical elliptic curve cryptography.

The embedding of bits of the message data in both the X and Z coordinate of an elliptic curve point results in 50% saving in computational complexity while maintaining the same level of security. The reason is that the number of points that satisfy an elliptic curve equation and which can be used in the corresponding cryptosystem is proportional to $p^2$ rather than p. Hence, for the same number of embedded bits, a smaller p can be used when embedding in both the X and Z coordinates than when embedding only in the x-coordinate. This results in faster implementations and reduced power consumption.

DESCRIPTION OF THE PREFERRED EMBODIMENTS OF THE INVENTION

3 Definition of a Set of Elliptic Curve Points Represented in Projective Coordinate as a Group Over Addition:

It is well known that the symbol $\in$ denote set membership.

Given a field $F(p)$, and a & $b \in F(p)$, we define $EC^2$ as the set of points $(x,y)$ that satisfy the elliptic curve equation in affine coordinate, that is equation 1.1, where x & $y \in F(p)$ together with a point at infinity.

It is shown in the above mentioned book by N. Koblitz, that using the addition rules defined above for the set of points $EC^2$, the set $EC^2$ forms an abelian group over addition, $(EC^2, +)$.

A new projection $(X,Y,Z)$ is defined here as Ibrahim's projection, which is related to the affine coordinate as follows, $$y = \frac{Y}{Z^{\frac{3}{2}}} \quad x = \frac{X}{Z} \qquad 3.1$$

Substituting Ibrahim's projection in equation 1.1, one obtains Ibrahim's form of the elliptic curve equation, $$\tilde{F}(X, Y, Z) = Z^3 F\left(\frac{X}{Z}, \frac{Y}{Z^{\frac{3}{2}}}\right) = Y^2 - X^3 - aXZ^2 - bZ^3 = 0 \qquad 3.2$$

Note that if $F(x,y)$ is non-singular, i.e. $4a^2 + 27b^3 \neq 0$, then $\tilde{F}(X,Y,Z)$ is also non-singular. In what follows, assume non-singular elliptic curve equations.

The set of points $EC^3$ is defined as the triplets $(X,Y,Z)$, where X,Y & $Z \in F(p)$, that satisfy Ibrahim's form of the elliptic curve equation plus a point at infinity $(X_I, Y_I, Z_I)$ and excluding the point at the origin, $(0,0,0)$.

Note that $EC^3$ is in projective coordinates while $EC^2$ is in affine coordinates.

The addition rules for the group $(EC^2, +)$ can be adopted to define an additive binary operation, +, over $EC^3$, that is for all $(X_1, Y_1, Z_1) \in EC^3$ and $(X_2, Y_2, Z_2) \in EC^3$, the sum, $$(X_3, Y_3, Z_3) = (X_1, Y_1, Z_1) + (X_2, Y_2, Z_2) \qquad 3.3$$

is also $(X_3, Y_3, Z_3) \in EC^3$.

It is shown that $(EC^3, +)$ also forms a group over addition that satisfies the following axioms:

(i) There exists $(X_I, Y_I, Z_I) \in EC^3$ such that $(X, Y, Z) + (X_I, Y_I, Z_I) = (X, Y, Z)$ for all $(X, Y, Z) \in EC(K^3)$, (ii) For every $(X, Y, Z) \in EC^3$ there exists $-(X, Y, Z) \in EC^3$ such that $(X, Y, Z) - (X, Y, Z) = (X_I, Y_I, Z_I)$, (iii) the additive binary operation is commutative.

(iv) the additive binary operation is associative.

3.1 Definition of the Addition Rules for the Group $(EC^3, +)$:

Addition of two points on an elliptic curve in projective coordinate, $EC^3$, is calculated as follows. When a straight line is drawn through the two points of $EC^3$, the straight line intersects the elliptic curve in projective coordinate at a third point. The point symmetric to this third intersecting point with respect to the X-axis is defined as a point resulting from the addition.

A straight-line equation in projective coordinates is given by, $$\frac{X - X_1}{X_2 - X_1} = \frac{Y - Y_1}{Y_2 - Y_1} = \frac{Z - Z_1}{Z_2 - Z_1} \qquad 3.4$$

The basic rule can be formulated as follows: Draw the line that joins the two points to be added in the set $EC^3$. Denoting the third point of intersection as $(X'_3, Y'_3, Z'_3)$, the sum point is defined as $(X_3, Y_3, Z_3) = (X'_3, -Y'_3, Z'_3)$.

It follows from the above definition that the addition over $EC^3$ is commutative, i.e. $(X_1, Y_1, Z_1) + (X_2, Y_2, Z_2) = (X_2, Y_2, Z_2) + (X_1, Y_1, Z_1)$ for all $(X_1, Y_1, Z_1) \in E(K^3)$, $(X_2, Y_2, Z_2) \in E(K^3)$. This satisfies axiom (iii) above.

There are four main cases that need to be considered for the computation of addition for $(EC^3, +)$:

A. $X_1 \neq X_2$
B. $X_1 = X_2$ & $Z_1 \neq Z_2$
C. $(X_1, Y_1, Z_1) = (X_2, Y_2, Z_2)$ (point doubling)
D. $X_1 = X_2$ & $Z_1 = Z_2$ Case A: $X_1 \neq X_2$ In this case, one can write, $$Y'_3 = Y_1 + m_y(X'_3 - X_1) \qquad 3.5$$

and $$Z'_3 = Z_1 + m_z(X'_3 - X_1) \qquad 3.6$$

where $$m_y = \frac{Y_2 - Y_1}{X_2 - X_1} \qquad 3.7$$

and $$m_z = \frac{Z_2 - Z_1}{X_2 - X_1} \qquad 3.8$$

Substituting equations 3.5 for $Y'_3$ and equation 3.6 for $Z'_3$ in Ibrahim's form of the elliptic curve equation, equation 3.2, one obtains $$(Y_1 + m_y(X - X_1))^2 - X^3 - aX(Z_1 + m_z(X - X_1))^2 - b(Z_1 + m_z(X - X_1))^3 = 0 \qquad 3.9$$

Expanding the terns between brackets and grouping the terms with the same powers of X, one obtains, $$X^3 + am_z^2 X^3 + bm_z^3 X^3 - m_y^2 X^2 + 2am_z Z_1 X^2 - 2am_z^2 X^2 X_1 + \quad 3.10$$
$$bm_z^2 Z_1 X^2 + 2bm_z^2 Z_1 X^2 - 2bm_z^2 X^2 X_1 - bm_z^3 X^2 X_1 -$$
$$2m_y Y_1 X + 2m_y^2 X X_1 + aXZ_1^2 - 2am_z Z_1 X X_1 + am_z^2 X X_1^2 +$$
$$2bm_z Z_1^2 X - 2X X_1 bm_z^2 Z_1 + bm_z X Z_1^2 - 4bm_z^2 Z_1 X X_1 +$$
$$bm_z^2 X X_1^2 + 2bm_z^3 X X_1^2 - Y_1^2 + 2m_y Y_1 X_1 - m_y^2 X_1^2 + bZ_1^3 -$$
$$2bm_z Z_1^2 X_1 + bX_1^2 m_z^2 Z_1 - bm_z X_1 Z_1^2 + 2bm_z^2 Z_1 X_1^2 -$$
$$bm_z^3 X_1^3 = 0$$

Any cubic equation has three roots, $$(X-X_1)(X-X_2)(X-X'_3)=0 \quad 3.11$$

Scaling the coefficient of the term $X^3$ to 1 in equation 3.10, and equating the coefficient of the term $X^2$ in equations 3.10 and 3.11, one obtains, $$X'_3 = \frac{1}{c}(m_y^2 - 2am_z Z_1 + 2am_z^2 X_1 - 3bm_z^2 Z_1 + \quad 3.12$$
$$3bm_z^3 X_1) - X_1 - X_2$$

or $$X'_3 = \frac{1}{c}(m_y^2 - (2a + 3bm_z)m_z Z_1 + (2a + 3bm_z)m_z^2 X_1) - \quad 3.13$$
$$X_1 - X_2$$

and after grouping terms to reduce the number of computations, one obtains, $$X'_3 = \frac{1}{c}(m_y^2 - m_z(2a + 3bm_z)(Z_1 - m_z X_1)) - X_1 - X_2 \quad 3.14$$

where, $$c = 1 + am_z^2 + bm_z^3 \quad 3.15$$

Substituting for the solution of $X'_3$, which is given in equation 3.14, in equation 3.5 one obtains the solution for $Y'_3$.

Similarly, substituting for the solution of $X'_3$, which is given in equation 3.14, in equation 3.6 one obtains the solution for $Z'_3$.

Case B: $X_1 = X_2$ & $Z_1 \neq Z_2$

Letting $X_0 = X_1 = X_2$. In this case $X_3 = X_1 = X_2 = X_0$, because the straight line is in the YZ-plane $X_0$.

In this case, one can write, $$Y'_3 = Y_1 + n_y(Z'_3 - Z_1) \quad 3.16$$

where $$n_y = \frac{Y_2 - Y_1}{Z_2 - Z_1}$$

Substituting equation 3.16 for $Y'_3$ in Ibrahim's form of the elliptic curve equation, equation 3.2, and noting that $X = X_0$, one obtains $$(Y_1 + n_y(Z-Z_1))^2 - X_0^3 - aX_0 Z^2 - bZ^3 = 0 \quad 3.17$$

Expanding the terms between brackets and grouping the terms with the same powers of Z, one obtains, $$Z^3 - \frac{1}{b}(n_y^2 Z^2 - aX_o Z^2) + \frac{1}{b}(2n_y Y_1 Z - 2n_y^2 Z Z_1 + \quad 3.18$$
$$Y_1^2 - 2n_y Y_1 Z_1 + n_y^2 Z_1^2 - X_o^3) = 0$$

Any cubic equation has three roots, $$(Z-Z_1)(Z-Z_2)(Z-Z'_3)=0 \quad 3.19$$

Equating the coefficient of the term $Z^2$ in equations 3.18 and 3.19, one obtains, $$Z'_3 = \frac{1}{b}(n_y^2 - aX_o) - Z_1 - Z_2 \quad 3.20$$

Substituting for the solution of $Z'_3$, which is given in equation 3.20, in equation 3.16 one obtains the solution for $Y'_3$.

Case C: Point Doubling, that is $(X_1,Y_1,Z_1)=(X_2,Y_2,Z_2)$

Letting $(X_0,Y_0,Z_0)=(X_1,Y_1,Z_1)=(X_2,Y_2,Z_2)$, that is, $$(X_3,Y_3,Z_3)=2(X_0,Y_0,Z_0)$$

Doubling a point on an elliptic curve in projective coordinates can be defined in several ways.

| | |
|---|---|
| C.1 | When a tangent line in a XY-plane is drawn at a point on an elliptic curve, the tangent line intersects the elliptic curve in the projective coordinate, $EC^3$, at another point. The point symmetric to this intersecting point with respect to the X-axis is defined as a point resulting from the doubling. Note that in this case, $Z'_3 = Z_0$. |
| C.2 | When a tangent line in a YZ-plane is drawn at a point on an elliptic curve, the tangent line intersects the elliptic curve in the projective coordinate, $EC^3$, at another point. The point symmetric to this intersecting point with respect to the X-axis is defined as a point resulting from the doubling. Note that in this case, $X'_3 = X_0$. |
| C.3 | Some form of a combination of rules C.1 and C.2. The simplest is to perform doubling using rule C.1 followed by another doubling using rule C.2. Another is to use the gradients in C.1 and C.2 simultaneously. |

Consider case C.1 and case C.2 only.

Case C.1: In this case, $Z_3 = Z_1 = Z_2 = Z_0$. The gradient of the tangent of the point $(X_0,Y_0,Z_0)$ of the elliptic curve in projective coordinates in a XY-plane is given by, $$\frac{dY}{dX} = \frac{3X_o^2 + aZ_o^2}{2Y_o} = m_y \qquad 3.21$$

Substituting equation 3.21 for $m_y$ in equation 3.14, and noting that $m_z=0$ in this case, one obtains a solution for $X'_3$, $$X_3 = m_y^2 - X_1 - X_2 \qquad 3.22$$

Substituting for the solution of $X'_3$, which is given in equation 3.22, in equation 3.5 one obtains the solution for $Y'_3$.

Case C.2: In this case, $X_3 = X_1 = X_2 = X_0$. The gradient of the tangent of the point $(X_0, Y_0, Z_0)$ of the elliptic curve in projective coordinates in a YZ-plane is given by, $$\frac{dY}{dZ} = \frac{2aX_o Z_o + 3bZ_o^2}{2Y_o} = n_y \qquad 3.23$$

Substituting equation 3.23 for $n_y$ in equation 3.20 one obtains a solution for $Z'_3$, $$Z'_3 = \frac{1}{b}(n_y^2 - aX_o) - Z_1 - Z_2 \qquad 3.24$$

Substituting for the solution of $Z'_3$, which is given in equation 3.24, in equation 3.16 one obtains the solution for $Y'_3$.

Case D $X_1 = X_2$ & $Z_1 = Z_2$

Letting $X_0 = X_1 = X_2$ and $Z_0 = Z_1 = Z_2$. Substituting these values directly in the Ibrahim form of the elliptic curve equation, equation 3.2, one obtains a quadratic equation for the Y-coordinate, $$Y^2 = X_0^3 + aX_0 Z_0^2 + bZ_0^3 \qquad 3.25$$

Denoting $Y_0$ as one of the solutions. Clearly, the other solution is $-Y_0$.

Therefore, a line perpendicular to the XZ-plane intersects $EC^3$ at only two points $(X,Y,Z)$ & $(X,-Y,Z) \in EC^3$. This clearly shows the symmetry of $EC^3$ about the X-axis and the Z-axis. Furthermore, every $(X,Y,Z) \in EC^3$ has a unique mirror image point $(X,-Y,Z) \in EC^3$. Now, since a line joining such pairs $(X,Y,Z)$ & $(X,-Y,Z) \in EC^3$ does not intersect with $EC^3$ at a third finite point, such lines are assumed to intersect with $EC^3$ at the point of infinity $(X_1,Y_1,Z_1)$. This point at infinity is used to define both the inverse of a point in $EC^3$ and the identity point. According to the addition rule defined in section 3.1, one can write, $$(X,Y,Z) + (X,-Y,Z) = (X_1, Y_1, Z_1) \qquad 3.26$$

since the third point of intersection of such lines is the point at infinity. This equation therefore defines a unique inverse for any point $(X,Y,Z) \in EC^3$, $$-(X,Y,Z) = (X,-Y,Z) \qquad 3.27$$

Therefore equation 3.26 can be written as, $$(X,Y,Z) - (X,Y,Z) = (X_1, Y_1, Z_1) \qquad 3.28$$

One can also say that a line joining the point at infinity and any point $(X,Y,Z) \in EC^3$, will intersect with $EC^3$ at $(X,-Y,Z)$. Therefore from the addition rule defined in section 3.1, one can also write, $$(X,Y,Z) + (X_1, Y_1, Z_1) = (X,Y,Z) \qquad 3.29$$

Equation 3.28 satisfies axiom (ii) while equation 3.29 satisfies axiom (i) of the Group $(EC^3, +)$.

3.2 Associativity of $EC^3$:

One way of proving associativity of $(EC^3, +)$ is as follows. Given particular elliptic curves (i.e. for particular coefficient's "a & b" and finite filed F(p), it can be shown by computation that any point $Q \in EC^3$ can be uniquely written as $k_Q P$, where P is the generator point of the group $(EC^3, +)$. $EC^3$ groups based on such curves are associative, because any three points $Q, R, S \in EC^3$ can be written as $k_Q P$, $k_R P$, $k_S P \in EC^3$ respectively and hence their sum $(Q+R+S) = (k_Q P + k_R P + k_S P) = (k_Q + k_R + k_S)P$ can be carried out in any order.

4. Second Projective Coordinate

Each of the equations for point addition and point doublings derived for the cases A, B and C in section 3 require one modular inversion or division. In cases where field inversions or divisions are significantly more expensive than multiplication, a second projective coordinate is used to remove the requirement for field inversion or division from these equations. As shown below, the numbers of operations needed for $EC^3$ point doubling and point additions when performed in the second projective coordinate are comparable to those needed in $EC^2$.

Several projective coordinates can be used.

In this invention, the homogenous projection is used as an example, $$X = \frac{X}{V} \qquad 4.1.a$$

$$Y = \frac{Y}{V} \qquad 4.1.b$$

$$Z = \frac{Z}{V} \qquad 4.1.c$$

Using this projection in the Ibrahim's form of the elliptic curve equation, equation 3.2, one obtains the Homogenous-Ibrahim elliptic curve equation, $$\tilde{F}(X, Y, Z, V) = V\tilde{F}\left(\frac{X}{V}, \frac{Y}{V}, \frac{Z}{V}\right) \qquad 4.2$$
$$= Y^2 V - X^3 - aXZ^2 - bZ^3 = 0$$

An elliptic curve projective point (X, Y, Z, V) using Homogenous-Ibrahim projective coordinates satisfies the Homogenous-Ibrahim elliptic curve equation, equation 4.2.

When $V \neq 0$, the Homogenous projected point (X, Y, Z, V) corresponds to the Ibrahim-projected point, $$(X, Y, Z,) = \left(\frac{X}{V}, \frac{Y}{V}, \frac{Z}{V}\right).$$

Using homogenous projective coordinates, equation 3.3 can be written as, $$\left(\frac{X_3}{V_3}, \frac{Y_3}{V_3}, \frac{Z_3}{V_3}\right) = \left(\frac{X_1}{V_1}, \frac{Y_1}{V_1}, \frac{Z_1}{V_1}\right) + \left(\frac{X_2}{V_2}, \frac{Y_2}{V_2}, \frac{Z_2}{V_2}\right) \quad 4.3$$

In what follows, it is shown how the homogenous projective coordinates can be used to remove the need for modular inversion or division from the equations in section 3. This is carried out for each of the Cases A, B and C.

Case A:

Substituting for X, Y and Z in terms of the projective coordinates in equations 4.1.a-c, in equation 3.12, and noting that $c=1+am_z^2+bm_z^3$, one obtains, $$\frac{X_3'}{V_3'} = \frac{(\lambda_{yv}^2 \lambda_{xv} - 2a\lambda_{zv}\lambda_{xv}^2 Z_1 + 2a\lambda_{zv}^2 \lambda_{xv} X_1 - 3b\lambda_{zv}^2 \lambda_{xv} Z_1 + 3b\lambda_{zv}^3 X_1)}{\lambda_{xzv}} - \frac{X_1'}{V_1} - \frac{X_2'}{V_2} \quad 4.4$$

where $$\lambda_{xv} = (X_2 V_1 - X_1 V_2) \quad 4.5$$

$$\lambda_{yv} = (Y_2 V_1 - Y_1 V_2) \quad 4.6$$

$$\lambda_{zv} = (Z_2 V_1 - Z_1 V_2) \quad 4.7$$

$$\lambda_{xzv} = (\lambda_{xv}^3 + a\lambda_{xv}\lambda_{zv}^2 + b\lambda_{zv}^3) \quad 4.8$$

Letting $$V_3 = V_1 V_2 \lambda_{xv} \lambda_{xzv} \quad 4.9$$

Substituting equation 4.9 for $V_3$ in equation 4.4, one obtains, $$X'_3 = \lambda_{xv} A_{x3} \quad 4.10$$

where $$A_{x3} = \{\lambda_{yv}^2 \lambda_{xv} V_2 - \lambda_{zv}(2a\lambda_{xv} + 3b\lambda_{zv})(\lambda_{xv} Z_1 V_2 - \lambda_{zv} X_1 V_2) - \lambda_{xzv}(V_2 X_1 + V_1 X_2)\} \quad 4.11$$

Substituting for X and Y in terms of the projective coordinates in equations 4.1.a & b, in equation 3.5, and after some simplification, one obtains, $$\frac{Y_3'}{V_3} = \frac{Y_1}{V_1} + \frac{(Y_2 V_1 - Y_1 V_2)}{(X_2 V_1 - X_1 V_2) V_3}\left(X_3' - \frac{X_1 V_3}{V_1}\right) \quad 4.12$$

Substituting equations 4.9 and 4.10 for $V_3$ and $X'_3$ in equation 4.12, one obtains, $$Y'_3 = V_2 \lambda_{xv} \lambda_{xzv} Y_1 + \lambda_{yv}(A_{x3} - V_2 \lambda_{xzv} X_1) \quad 4.13$$

Substituting for X and Z in terms of the projective coordinates in equations 4.1.a & c, in equation 3.6, and after some simplification, one obtains, $$\frac{Z_3'}{V_3} = \frac{Z_1}{V_1} + \frac{(Z_2 V_1 - Z_1 V_2)}{(X_2 V_1 - X_1 V_2) V_3}\left(X_3' - \frac{X_1 V_3}{V_1}\right) \quad 4.14$$

Substituting equations 4.9 and 4.10 for $V_3$ and $X'_3$ in equation 4.14, one obtains, $$Z'_3 = V_2 \lambda_{xv} \lambda_{xzv} Z_1 + \lambda_{zv}(A_{x3} - V_2 \lambda_{xzv} X_1) \quad 4.15$$

The numbers of field operations needed in equations 4.10, 4.13 & 4.15 are twenty four multiplications, three squaring, and ten additions. When using mixed coordinates, the number of multiplications can be reduced to twenty multiplications.

Case B:

Substituting for X, Y and Z in terms of the heterogeneous projective coordinate, that is equations 4.1a-c, in equation 3.20, and noting $X_3 = X_1 = X_2 = X_0$, one obtains, $$\frac{Z_3'}{V_3} = \frac{1}{b}\frac{(Y_2 V_1 - Y_1 V_2)^2}{V_1 V_2 (Z_2 V_1 - Z_1 V_2)^2} - \frac{a}{b}\frac{X_1}{V_1} - \frac{Z_1}{V_1} - \frac{Z_2}{V_2} \quad 4.16$$

Letting, $$V_3 = V_1^2 V_2^2 (Z_2 V_1 - Z_1 V_2)^3 \quad 4.17$$

Substituting equation 4.17 for $V_3$ in equation 4.16, one obtains, $$Z_3' = \frac{1}{b} V_1 V_2 (Z_2 V_1 - Z_1 V_2) A_{3x} \quad 4.18$$

where $$A_{3x} = \{(Y_2 V_1 - Y_1 V_2)^2 - (Z_2 V_1^2 - Z_1 V_2^2)^2 \left(\frac{a}{b} X_1 V_2 + Z_1 V_2 + Z_2 V_1\right)\} \quad 4.19$$

Substituting for Y and Z in terms of the projective coordinates in equations 4.1 b & c, in equation 3.16, one obtains, $$\frac{Y_3'}{V_3} = \frac{Y_1}{V_1} \frac{(Y_2 V_1 - Y_1 V_2)}{V_3}$$
$$\left(\frac{Z_3'}{V_1 V_2(Z_2 V_1 - Z_1 V_2)} - \frac{Z_1 V_3}{V_1 V_2(Z_2 V_1 - Z_1 V_2)V_1}\right) \quad 4.20$$

Substituting equations 4.17 and 4.18 for $V_3$ and $Z'_3$ in equation 4.20, one obtains, $$Y_3' = V_1 V_2^2 (Z_2 V_1 - Z_1 V_2)^3 Y_1 + (Y_2 V_1 - Y_1 V_2)\left(\frac{1}{b} A_{3x} - Z_1 V_2 (Z_2 V_1 - Z_1 V_2)^2\right) \quad 4.21$$

The numbers of field operations needed in equations 4.18 & 4.21 are sixteen multiplications, two squaring, and seven additions.

Case C:

Case C.1:

Substituting for X, Y and Z in terms of the projective coordinate in equations 4.1.a-c, in equation 3.22, one obtains, $$\frac{X_3'}{V_3} = \frac{(3X_o^2 + aZ_o^2)^2}{4V_o^2 Y_o^2} - 2\frac{X_o}{V_o} \quad 4.22$$

Letting, $$V_3 = 8V_o^3 Y_o^3 \quad 4.23$$

Substituting equation 4.23 for $V_3$ in equation 4.22, one obtains, $$X'_3 = 2V_o Y_o D_{3x} \quad 4.24$$

where $$D_{3x} = \{(3X_o^2 + aZ_o^2)^2 - 8V_o Y_o^2 X_o\} \quad 4.25$$

Substituting for X, Y and Z in terms of the projective coordinate in equations in equations 4.1a-c, in equation 3.5 and using the gradient in equation 3.21, one obtains, $$\frac{Y'_3}{V_3} = \frac{Y_o}{V_o} + \frac{3X_o^2 + aZ_o^2}{V_3} \quad 4.26$$

$$\left(\frac{2V_o Y_o D_{3x}}{2V_o Y_o} - \frac{X_o V_o}{2V_o Y_o V_o}\right)$$

Substituting equation 4.23, 4.24 and 4.25 for $V_3$, $X'_3$ and $D_{3x}$ in equation 4.26, one obtains, $$Y'_3 = 8V_o^2 Y_o^4 + 3X_o^2 + aZ_o^2((3X_o^2 + aZ_o^2)^2 - 12V_o Y_o^2 X_o) \quad 4.27$$

The numbers of field operations needed in equations 4.24 & 4.27 are six multiplications, four squaring, and five additions.

Case C.2:

Substituting for X, Y and Z in terms of the projective coordinate in equations 4.1a-c, in equation 3.24, one obtains, $$\frac{Z'_3}{V_3} = \frac{1}{b} \frac{(2aX_o Z_o + 3bZ_o^2)^2}{4Y_o^2 V_o^2} - \frac{a}{b} \frac{X_o}{V_o} - 2\frac{Z_o}{V_o} \quad 4.28$$

Letting $$V_3 = 8V_o^3 Y_o^3 \quad 4.29$$

Substituting equation 4.29 for $V_3$ in equation 4.28, one obtains, $$Z'_3 = 2V_o Y_o D_{3z} \quad 4.30$$

where $$D_{3z} = \left\{\frac{1}{b}(2aX_o Z_o + 3bZ_o^2)^2 - 4\frac{a}{b}V_o Y_o^2 X_o - 16V_o Y_o^2 Z_o\right\} \quad 4.31$$

Substituting for X, Y and Z in terms of the projective coordinate in equations 4.1a-c, in equation 3.16 and using the gradient in equation 3.23, one obtains, $$\frac{Y'_3}{V_3} = \frac{Y_0}{V_o} + \frac{2aX_o Z_o + 3bZ_o^2}{2V_o Y_0}\left(\frac{Z'_3}{V_3} - \frac{Z_o}{V_o}\right) \quad 4.32$$

Substituting equations 4.29 and 4.30 for $V_3$ and $Z'_3$ in equation 4.32, one obtains, $$Y'_3 = 8V_o^2 Y_o^3 Y_0 + (2aX_o Z_o + 3bZ_o^2)(D_{3z} - 4V_o Y_o^2 Z_0) \quad 4.33$$

The numbers of field operations needed in equations 4.30 & 4.33 are ten multiplications, three squaring, and five additions.

5 $EC^3$ Elliptic Curve Cryptography:

5.1 Symmetric $EC^3$ Cryptography:

Symmetric $EC^3$ Cryptography is carried out as follows:
1 Both the sending and receiving entities agree on a set $EC^3$ by selecting an elliptic curve. They also need to agree on (i) a random number, k, that will be the shared secret key for communication, (ii) a base point, $(X_B, Y_B, Z_B) \in EC^3$.

The sending entity performs the following steps,
2 Embed the secret message bit string into the elliptic curve message point, $(X_m, Y_m, Z_m)$. A possible method of embedding the message bits is described in section 5.4.
3 Using the shared key, k, and the base point $(X_B, Y_B, Z_B)$, the scalar multiplication $(X_{Bk}, Y_{Bk}, Z_{Bk}) = k(X_B, Y_B, Z_B)$ is computed.
4 The cipher point $(X_c, Y_c, Z_c)$ is computed using, $$(X_c, Y_c, Z_c) = (X_m, Y_m, Z_m) + k(X_B, Y_B, Z_B)$$

5 The appropriate bits of the X-coordinate, $X_C$, and the Z-coordinate, $Z_C$, of the cipher point $(X_c, Y_c, Z_c)$ are sent to the receiving entity.

At the receiving entity, the following steps are performed,
6 Using the shared key, k, and the base point $(X_B, Y_B, Z_B)$, the scalar multiplication $(X_{Bk}, Y_{Bk}, Z_{Bk}) = k(X_B, Y_B, Z_B)$ is computed.
7 The message point $(X_m, Y_m, Z_m)$ is computed using, $$(X_m, Y_m, Z_m) = (X_c, Y_c, Z_c) + (-k(X_B, Y_B, Z_B))$$

8 The secret messages bit string is recovered from $X_m$ and $Z_m$. For more details see section 5.4.

5.2 Public Key $EC^3$ Cryptography:

In public key cryptography, the sending and the receiving entities use two keys. Each has a private key, $k_{pr}$, and a public key, $(X_{Pu}, Y_{Pu}, Z_{Pu}) = k_{Pr}(X_B, Y_B, Z_B)$. The sending entity uses its private key and the receiver public key to perform encryption of the secret message bits. The receiver uses its private key and the sender's public key to perform decryption.

5.3 $EC^3$ Digital Signature:

All the schemes used for digital signatures that are based on the representation of the elliptic curve points in affine coordinates can be adopted for $EC^3$ digital signatures.

This can be achieved either directly or with some modifications that exploit the X-coordinate and the Z-coordinate of an elliptic curve point, when represented in projective coordinate, in generating a digital signature.

A conventional elliptic curve digital signature can be basically summarized as follows. A more detailed description can be found in [N.Kobltiz, A. Menezes, S. Vanstone, The state of Elliptic Curve Cryptography, Designs, Codes, and Cryptography, Vol 19, 2000, pp 173-193.]. The entity which generates a signature has a private key, $k_{Pr}$, and a public key, $(x_{Pu}, y_{Pu}) = k_{Pr}(x_B, y_B)$. Given a message M, the entity generating the signature performs the following steps,
1 select a random integer, k, mod p.
2 compute $(x_1, y_1) = k(x_B, y_B)$ and convert $x_1$ to an integer r modp.
3 compute a message digest, digest(M), which is a bit string that is dependant on the message, and convert the bit string onto an integer e.
4 compute $s = k^{-1}(e + k_{Pr}r) \mod p$
5 signature of the message M is (r,s).

The signature is verified at the receiving entity using the following steps,
1 compute a message digest, digest(M), and convert the bit string onto an integer e,
2 compute $u_1 = es^{-1}$ mod p and $u_2 = rs^{-1}$ mod p,
3 compute $(x_2, y_2) = u_1(x_B, y_B) + u_2(x_{Pu}, y_{Pu})$, and convert $x_2$ into an integer v modp.
4 Accept the signature if v=r.

In one embodiment of using the X and Z coordinates for generating a digital signature, the above elliptic curve digital signature can be modified as follows. The entity which generates a signature has a private key, $k_{Pr}$, and a public key, $(X_{Pu}, Y_{Pu}, Z_{Pu}) = k_{Pr}(X_B, Y_B, Z_B)$. Given a message M, the entity generating the signature performs the following steps,
1 select a random integer, k, mod p.
2 compute $(X_1, Y_1, Z_1) = k(X_B, Y_B, Z_B)$, and concatenate the bit strings of $X_1$ & $Z_1$ together to form a single string $[X_1:Z_1]$ and convert the combined string into an integer r modp.
3 compute a message digest, digest(M), and convert the bit string onto an integer e.
4 compute $s = k^{-1}(e + k_{Pr}r)$ mod p
5 signature of the message M is (r,s).

The signature is verified at the receiving entity using the following steps,
1 compute a message digest, digest(M), and convert the bit string onto an integer e,
2 compute $u_1 = es^{-1}$ mod p and $u_2 = rs^{-1}$ mod p,
3 compute $(X_2, Y_2, Z_2) = u_1(X_B, Y_B, Z_B) + u_2(X_{Pu}, Y_{Pu}, Z_{Pu})$, and concatenate the bit strings of $X_2$ & $Z_2$ together to form a single string $[X_2:Z_2]$ and convert the combined string into an integer v modp.
4 Accept the signature if v=r.

5.4 Data Embedding:

Assuming that the secret message is a M-bit string where (2N−L)>M>(N−L). The message string is divided into two strings $m_1$ and $m_2$. The length of string $m_1$ must be no more than (N−L) bits, while the length of string $m_2$ must be no more than (N−1) bits. One embodiment of the embedding of the two strings can be carried out as follows:
 1 assign the value of the bit string of m2 to $Z_m$ using the following embedding procedure:
  a. Assign the value of the bit string $m_2$ to $R_m$.
  b. Use Legendre test to see if this value of $R_m$ has a square root.
  c. If $R_m$ has a square root, set $Z_m = R_m$, otherwise set $Z_m = gR_m$.
 2 Compute $aZ_m^2$ and $bZ_m^3$.
 3 Assign the value of the bit string of m1 to $X_m$.
 4 Compute $T = X_m^3 + (aZ_m^2)X_m + (bZ_m^3)$.
 5 Use Legendre test to see if T has a square root.
 6 If T has a square root, assign one of the roots to $Y_m$, else increment $X_m$ and go to step 4.
1 It should be noted that p is usually predetermined prior to encryption, and so the value of g can be predetermined.
2 When using the method above, the strings $m_1$ and $m_2$ can be recovered directly from $X_m$ and $Z_m$ respectively. An extra bit is needed to identify whether $R_m$ or $gR_m$ is used for $Z_m$ at the receiver. Therefore, to encode (N−1) message data bits, one needs to send N bits for the Z values.
3 Any non-quadratic value in F(p) can be used for g. For efficiency, g is chosen to be (−1) for p≡3 mod 4 and (2) for p≡1 mod 4.

4 At the receiver, the process is reversed. In the case of g=2, a division by 2 is carried out. It should noted that diving $R_m$ by two is computed using one modulo addition, because
(i) $R_m/2 = ((R_m - (R_m)\text{mod}2)/2) + (R_m)\text{mod}2*(1/2)$ mod p,
(ii) $(R_m)$mod 2 is the least significant bit of $R_m$, and
(iii) (1/2)mod p = (p+1)/2 .

6 Security of $EC^3$:

The effect of using the X-coordinate and the Z-coordinate of an elliptic curve point when represented in projective coordinate in the encrypting of message data bit-strings on the strength of elliptic curve cryptography is assessed in the following aspects:
 1 the effect on the solution of ECDLP,
 2 power analysis attacks.

6.1 ECDLP in $EC^3$:

The apparent intractability of the following elliptic curve discrete logarithm problem (ECDLP) is the basis of the security of elliptic curve cryptosystems. The ECDLP problem can be stated as follows: given an elliptic curve defined over F(p) that need N-bit for the representation of its elements, an elliptic curve point $(x_P, y_P) \in EC^2$ defined in affine coordinates, and a point $(x_Q, y_Q) \in EC^2$ defined in affine coordinates, determine the integer k, $0 \leq k \leq n-1$, such that $(x_Q, y_Q) = k(x_P, y_P)$ provided that such an integer exist. In what follows, it is assumed that such an integer exists.

The ECDLP in $EC^3$ can be stated as follows: given a point $(X_P, Y_P, Z_P) \in EC^3$ and a point $(X_Q, Y_Q, Z_Q) \in EC^3$ defined in projective coordinates, find k such that $(X_Q, Y_Q, Z_Q) = k(X_P, Y_P, Z_P)$.

All the known attacks that are used to solve the ECDLP in $EC^2$ are applicable to the solution of the ECDLP in $EC^3$. The most well known attach is that of Pollard ρ-method, [J. Pollard, Monte Carlo methods for index computation mod p, Mathematic and Computation, Vol. 32 (1978) pp. 918-924.] which has a complexity of $O(\sqrt{\pi n}/2)$, where a step means an elliptic curve addition [N. Kobltiz, A. Menezes, S. Vanstone, The state of Elliptic Curve Cryptography, Designs, Codes, and Cryptography, Vol 19, 2000, pp 173-193.]

In $EC^3$, the modified Pollard p-method can be formulated as follows: find two points $(X_i, Y_i, Z_i) = A_i(X_Q, Y_Q, Z_Q) + B_i k(X_P, Y_P, Z_P)$ and $(X_j, Y_j, Z_j) = A_j(X_Q, Y_Q, Z_Q) + B_j k(X_P, Y_P, Z_P)$ such that $(X_i, Y_i, Z_i) = (X_j, Y_j, Z_j)$, and hence $$k = \frac{A_i + A_j}{B_i + B_j},$$

and given that all the points are members of $EC^3$.

It is clear that the complexity of the Pollard p-method in $EC^3$ is not less than the complexity of the Pollard ρ-method in $EC^2$ for the same group order.

It should also be added that since $EC^3$ encryption and $EC^2$ encryption are generated by the same elliptic curve, all the analysis of the security of $EC^2$ cryptography will be applicable to the analysis of the security of $EC^3$ cryptography.

6.2 Security Against SPA and DPA:

Simple and differential power analysis can be used to attack $EC^3$ cryptosystems in a similar manner in which they are used to attack $EC^2$ cryptosystems.

The countermeasures that are used against simple and differential power analysis for $EC^2$ cryptosystems are also applicable for $EC^3$. For example, the countermeasures proposed by J-S Coron, in "Resistance Against Differential Power Analysis for Elliptic Curve Cryptosystems, Cryptographic Hardware and Embedded Systems, Vol. 1717, Lecture Notes in Computer Science, pp 292-302, Springer-Verlag, 1999", can all be adopted as countermeasures against power analysis in $EC^3$ cryptosystems. As an example, the randomized projective coordinates method can be applied in $EC^3$ by randomizing the coordinates of the second projection, that is $(X',Y',Z',V)=(X'\lambda,Y'\lambda,Z'\lambda,V\lambda)$, where $\lambda$ is a random variable.

The Legendre Symbol is used to test whether an element of $F(p)$ has a square root or not, i.e. whether an element is quadratic residue or not. This implies that one does not need to compute the square root to check if an element has a square root or not. The Legendre Symbol and test is described below:

Legendre Symbol

Given an element of a finite field $F(p)$, say d, the Legendre symbol is defined as $$\left(\frac{d}{p}\right).$$

To test whether d is quadratic residue or not, the Legendre symbol, $$\left(\frac{d}{p}\right),$$

is used:

$$\left(\frac{d}{p}\right) = \begin{cases} +1 & \text{if } x \text{ is quadratic residue} \\ 0 & \text{if } x \equiv 0 \bmod F(p) \\ -1 & \text{otherwise} \end{cases}$$

While the invention has been described in connection with the preferred embodiments, it should be recognized that changes and modifications may be made therein without departing from the scope of the appended claims.

The invention claimed is:

1. A method for encrypting and decrypting a message bit string in an information processing system for communicating securely over an insecure communication channel between a pair of correspondents who perform shared key cryptographic operations by implementing respective ones of a pair of complimentary mathematical cryptographic operations utilizing a shared key, said method comprising the steps of:
   providing a pair of complimentary mathematical cryptographic operations;
   assembling a data string including information to be transferred from a sending correspondent to a receiving correspondent;
   performing a complimentary mathematical operation using points on an elliptic curve defined over a finite field and represented in projective coordinates, and wherein an addition of points on the elliptic curve is defined in projective coordinates; and
   forwarding the defined group of points over a communication channel to a receiving correspondent and performing the other of the pair of corresponding complimentary mathematical cryptographic operations to decrypt the data; and
   where the elliptic curve points in projective coordinates are represented using three coordinates, $(X,Y,Z)$, wherein X, Y and Z are elements of $F(p)$ represented in N-bit strings, and which includes a step where extra message bits are embedded in the Z coordinate in addition to the message data bits that are embedded in the X coordinate;
   embedding a message bit string into the X and Z coordinates of an elliptic curve point which is designated as the message point, $(X_m Y_m Z_m)$;
   providing a shared key k and a base point $(X_b Y_b Z_b)$ and computing the scalar multiplication $(X_{bk} Y_{bk} Z_{bk}) = k(X_b Y_b Z_b)$;
   computing a cipher point $(X_c Y_c Z_c)$ using $(X_c Y_c Z_c) = (X_m Y_m Z_m) + k(X_b Y_b Z_b)$;
   sending appropriate bits of the X-coordinate, $X_c$ and the Z-coordinate $Z_c$ of the cipher point $(X_c Y_c Z_c)$ to a receiving party;
   using the shared key k and the base point $(X_b Y_b Z_b)$ computing the scalar multiplication $(X_{bk} Y_{bk} Z_{bk}) = k(X_b Y_b Z_b)$;
   computing the message point $(X_m Y_m Z_m)$ using $(X_m Y_m Z_m) = (X_c Y_c Z_c) + (-k(X_b Y_b Z_b))$;
   recovering the message bit string from $X_m$ and $Z_m$;
   in which the message bit string is divided into strings of length of M-bit where $(2N-L) > M > (N-L)$;
   in which a M-bit message string is further divided into two strings $m_1 m_2$, where the length of string $m_1$ must be no more than $(N-L)$ bits, while the length of string $m_2$ must be no more than $(N-1)$ bits; and
   which includes the steps of:
   assigning the value of the bit string of $m_2$ to $Z_m$ using the following procedure:
   i. assign the value of the bit string $m_2$ to $R_m$,
   ii. using Legendre test to determine if $R_m$ has a square root,
   iii. if $R_m$ has a square root set $Z_m = R_m$ otherwise set $Z_m = gR_m$ where g is any non-quadratic value in the underlying finite filed,
   and compute a $Z^2_m$ and $bZ^3_m$
   assign the value of the bit string of $m_1$ to $X_m$
   compute $T = X^3_m + (aZ^2_m)X_m + (bZ^3_m)$;
   using Legendre test to see if T has a square root;
   if T has a square root assign one of the roots to Y, if not continue incrementing $X_m$ and repeating the computation of T until T has a square root.

2. A method for transferring data over a communication channel according to claim 1 in which a second projective coordinate is used by the sending correspondent and to the receiving correspondent to eliminate the inversion or division during each addition and doubling operation of the scalar multiplication.

3. An encryption and decryption system in accordance with claim 2 and which is implemented either as a pure hardware unit, or as a program stored on a computer readable storage device and executed on a digital computer, or a combination of both.

4. A method for transferring data over a communication channel between a pair of correspondents who perform public key cryptographic operations by implementing respective ones of a pair of complimentary mathematical operations utilizing a public key and a private key of one of the correspondents, said method comprising the steps of:

providing a data string including information to be transferred from a sending correspondent to a receiving correspondent;

performing a complimentary mathematical operation using a group of points on an elliptic curve defined over a finite field and represented in projective coordinates, and wherein the group of points on the elliptic curve are defined over addition in projective coordinates; and forwarding the defined group of points over a communication channel to the receiving correspondent and performing the other of the pair of complimentary mathematical cryptographic operations of the public key and the private key cryptographic operation to decrypt the data; and where the elliptic curve points in projective coordinates are represented using three coordinates, (X,Y,Z), wherein X, Y and Z are elements of F(p) represented in N-bit strings, and which includes a step of embedding extra message bits in the Z coordinate in addition to the message data bits that are embedded in the X coordinate; and including the steps of:

embedding a message bit string into the X and Z coordinates of an elliptic curve point which is designated as the message point, $(X_m Y_m Z_m)$ by the sending correspondent;

using the private key of the sending correspondent, $k_{SPr}$, and the public key of the receiving correspondent, $k_{RPr}(X_b Y_b Z_b)$, to compute the scalar multiplication $(X_{bk} Y_{bk} Z_{bk}) = k_{SPr}(k_{RPr}(X_b Y_b Z_b))$;

computing a cipher point $(X_c Y_c Z_c)$ using $(X_c Y_c Z_c) = (X_m Y_m Z_m) + (X_{bk} Y_{bk} Z_{bk})$;

sending appropriate bits of the X-coordinate, $X_c$ and the Z-coordinate $Z_c$ of the cipher point $(X_c Y_c Z_c)$ to the receiving correspondent;

using the private key of the receiving correspondent, $k_{RPr}$, and the public key of the sending correspondent, $k_{SPr}(X_b Y_b Z_b)$, to compute the scalar multiplication $(X_{bk} Y_{bk} Z_{bk}) = k_{RPr}(k_{SPr}(X_b Y_b Z_b))$;

computing the message point $(X_m Y_m Z_m)$ using $(X_m Y_m Z_m) = (X_c Y_c Z_c) - (X_{bk} Y_{bk} Z_{bk})$;

recovering the message bit string from $X_m$ and $Z_m$;

in which the message bit string is divided into strings of length of M-bit where (2N−L)>M>(N−L);

in which a M-bit message string is further divided into two strings $m_1 m_2$, where the length of string $m_1$ must be no more than (N−L) bits, while the length of string $m_2$ must be no more than (N−1) bits; and which includes the steps of:

assigning the value of the bit string of $m_2$ to $Z_m$ using the following procedure:

iv. assign the value of the bit string $m_2$ to $R_m$, v. using Legendre test to determine if $R_m$ has a square root, vi. if $R_m$ has a square root set $Z_m = R_m$ otherwise set $Z_m = gR_m$ where g is any non-quadratic value in the underlying finite filed, and compute a $Z_m^2$ and $bZ_m^3$ assign the value of the bit string of $m_1$ to $X_m$ compute $T = X_{m+(aZ_m^2)}^3 X_m + (bZ_m^3)$;

using Legendre test to see if T has a square root;

if T has a square root assign one of the roots to Y, if not continue incrementing $X_m$ and repeating the computation of T until T has a square root.

5. A method for transferring data over a communication channel according to claim 4 in which a second projective coordinate is used by the sending correspondent and to the receiving correspondent to eliminate the inversion or division during each addition and doubling operation of the scalar multiplication.

6. An encryption and decryption system in accordance with claim 5 and which is implemented as a pure hardware unit, or as a program stored on a computer readable storage device and executed on a digital computer.

* * * * *